(12) United States Patent
Loretz et al.

(10) Patent No.: US 9,121,244 B2
(45) Date of Patent: Sep. 1, 2015

(54) ELASTICALLY RESPONSIVE UNIBODY SHEAR VALVE

(71) Applicant: Schlumberger Technology Corporation, Sugar Land, TX (US)

(72) Inventors: Ives D. Loretz, Houston, TX (US); Spyro Kotsonis, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 142 days.

(21) Appl. No.: 13/716,582

(22) Filed: Dec. 17, 2012

(65) Prior Publication Data

US 2013/0333898 A1    Dec. 19, 2013

Related U.S. Application Data

(60) Provisional application No. 61/659,779, filed on Jun. 14, 2012.

(51) Int. Cl.
*E21B 34/06* (2006.01)
*F16K 11/065* (2006.01)

(52) U.S. Cl.
CPC .............. *E21B 34/06* (2013.01); *F16K 11/0655* (2013.01)

(58) Field of Classification Search
USPC .................................. 166/373, 386, 316, 319
See application file for complete search history.

(56) References Cited

U.S. PATENT DOCUMENTS

| 3,917,220 | A | * | 11/1975 | Gilmore | 251/86 |
| 4,187,883 | A | | 2/1980 | Webster | |
| 4,493,335 | A | | 1/1985 | Watson | |
| 4,793,591 | A | | 12/1988 | Decker et al. | |
| 2009/0084553 | A1 | | 4/2009 | Rytlewski et al. | |
| 2010/0051289 | A1 | | 3/2010 | Constantine et al. | |

OTHER PUBLICATIONS

International Search Report and Written Opinion mailed on Aug. 23, 2013 for International Patent Application No. PCT/US2013/043842, filed on Jun. 3, 2013, 13 pages.

* cited by examiner

*Primary Examiner* — William P Neuder
(74) *Attorney, Agent, or Firm* — David J. Groesbeck; Brandon Clark

(57) ABSTRACT

A shear valve utilizing an elastically responsive unibody seal member in operation. The unibody seal member is of unitary construction and in terms of adjacent ends thereof and an energizing member disposed therebetween. Thus, governing of fluid flow through the metal valve may be achieved without undue concern over high pressure differentials, for example in a downhole environment. Further, the unitary construction of the seal member alleviates concern over mismatching tolerances and/or dimensions for separately assembled miniaturized components of the valve.

19 Claims, 6 Drawing Sheets

US 9,121,244 B2

ELASTICALLY RESPONSIVE UNIBODY SHEAR VALVE

PRIORITY CLAIM/CROSS REFERENCE TO RELATED APPLICATION(S)

This Patent Document claims priority under 35 U.S.C. §119 to U.S. Provisional App. Ser. No. 61/659,779, filed on Jun. 14, 2012, and entitled, "Shear Seal Valve" incorporated herein by reference in its entirety.

BACKGROUND

Exploring, drilling and completing hydrocarbon wells are generally complicated, time consuming and ultimately very expensive endeavors. As a result, over the years increased attention has been paid to monitoring and maintaining the health of such wells. Significant premiums are placed on maximizing the total hydrocarbon recovery, recovery rate, and extending the overall life of the well as much as possible. Thus, logging applications for monitoring of well conditions play a significant role in the life of the well. Similarly, significant importance is placed on well intervention applications, such as follow on clean-out or isolation techniques which may be utilized to enhance hydrocarbon recovery over time.

In addition to monitoring and more directly interventional applications, the completions architecture of the well often includes sophisticated level of hardware incorporated into the well from the outset. For example, a steel casing may be utilized to help define the well and promote rapid uphole production of well fluids. Once more, chemical injection lines may run to predetermined downhole production locations such as at casing perforations, a screen or slotted pipe. Thus, a significant buildup of irregular occlusive scale, wax and other debris may be avoided, thereby further promoting the noted production.

Along the same lines, the architecture of the well may include zonal isolation hardware, production tubing, and/or control valve governance so as to enhance desired types of production from the surrounding formation or injection into it. For example, while certain types of hydrocarbon fluid recovery is generally desired, the possibility of one or more regions of the formation beginning to produce water may arise. Thus, the well may be constructed of architecture which allows for production from the water producing regions to be shut off in circumstances where this is prone to occur. As such, continued production of the desired hydrocarbons through production tubing and the main bore of the well may continue without interference of water production.

As indicated, flow control valves may be utilized in helping to govern production from various zones. More specifically, fluid flow through each zone may be reversibly regulated by such a valve. Thus, production may be closed off should water be produced. Additionally, closure may be more temporary, for example in conjunction with an intervention. Subsequently, the valve may be reopened where production timing and type so dictate.

A control valve as described above is often comprised of a sophisticated hydraulic control module that regulates the operation of a full size hydraulically operated completions tool, such as a flow control valve, a safety valve, formation isolation valve or the likes. While fairly small for sake of limited downhole space, shear valves are nevertheless particularly adept at handling high pressure differential exposure which is common in the downhole environment. For example, a shear valve may operate by way of separate lines routed through a central shear space of the valve. Nevertheless, in circumstances where one line is particularly high pressure, say in excess of about 5,000 PSI, and another line is of fairly negligible pressure, the valve may be well suited to switch between lines without malfunction for long periods of time. That is, in spite of sudden exposure to a dramatic spike or drop-off in pressure, the valve is architecturally configured to effectively function. This is namely due to the metal to metal sealing interface between the internal seal member of the shear valve and the adjacent housings of the noted lines.

While well suited for use in environments where such differentials are present, a shear valve may require several subcomponents to achieve the desired functionality. For example, where the shear valve is internally energized by an elastomer, the material is prone to swell and degrade over time. This is due to the high temperature downhole fluid environment of the well. Thus, as a practical matter, an elastomerically energized shear seal may be limited in reliability in the long run.

In order to address the life deficiency issues of an elastomeric-based shear valve, a spring-based energizer may alternatively be utilized. In a spring-based energizer, concerns over swelling and material degradation are largely removed. However, as noted above, the shear valve for downhole applications may need to be fairly small and of comparatively narrow tolerances. By way of example, to serve as a control valve in the well, a shear type valve which is internally spring-based may utilize a spring that is about ⅛ of an inch or less in diameter. Once more, as also noted above, this spring would be sandwiched between adjacent metal interfaces of similar sizing. As a result, the functionality of the valve would now be reliant on the consistency of precision in construction among three separate, very small metal pieces (i.e. a spring and two metal interfaces). As a practical matter, the reliability of the valve is left in the hands of an extremely small thin wire spring with dead end coils sandwiched between adjacent interfacing blocks of metal.

A spring-based energizing shear valve as described above is likely to outsurvive a comparable elastomeric-based version in a downhole environment. For example, it is not uncommon to see about a ten year survivability requirement from such shear valves. However, given the narrow tolerances and fragile nature of the spring, the manufacturing of such a valve in large quantities may get complicated and expensive. Therefore, operators are often left with the undesirable choice between tolerating a loss in long term reliability or accept excessive production cost due to low yields.

SUMMARY

A shear valve assembly is disclosed which includes adjacent housings for accommodating different fluid ports. An elastically responsive unibody shear member is located within a shear space between the housings. Thus, while the member may simultaneously interface each housing, it may also govern fluid access relative the ports of the different housings.

DETAILED DESCRIPTION

Embodiments are described with reference to certain configurations of downhole fluid flow control hardware. In particular, systems are depicted and described which involve multi-zonal well isolation regions that utilize various shear valves for control over fluid production or injection on a zone by zone basis. However, a variety of other well architectures may employ embodiments of shear valves as detailed herein, multi-zonal or otherwise. Regardless, embodiments described herein include a shear valve that employs an embodiment of an elastically responsive unibody shear member to internally govern fluid flow through the valve.

Figure 1:
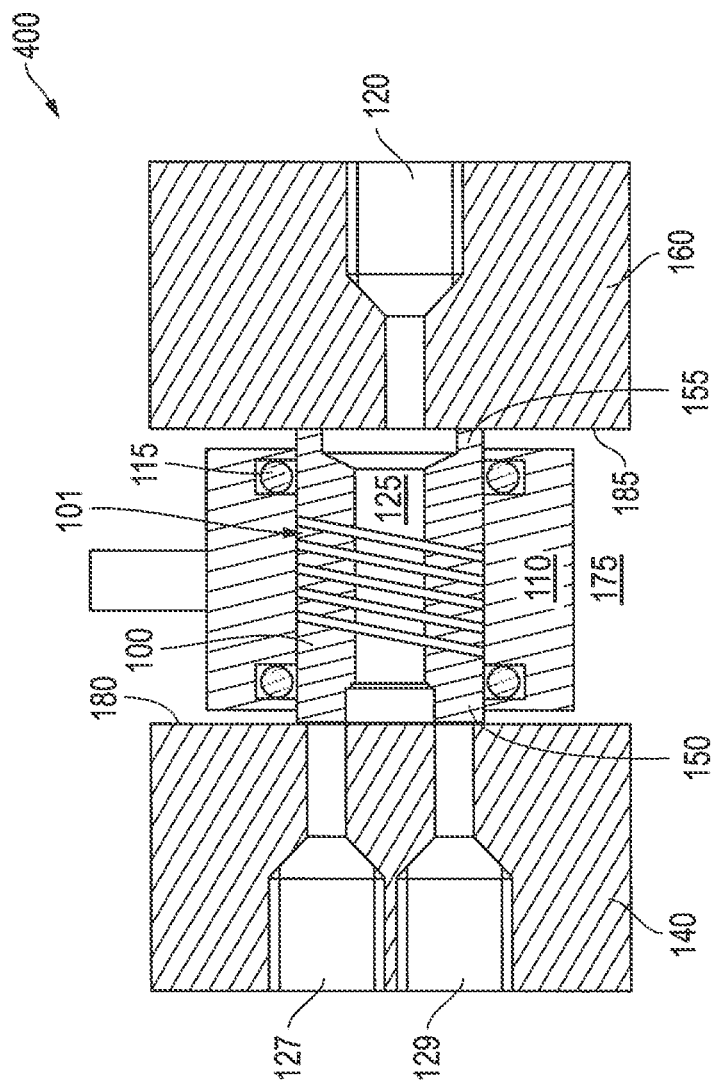
FIG. 1 is a side view of a shear valve employing an embodiment of an elastically responsive unibody shear member.

Referring now to FIG. 1, a schematic side view of a shear valve 400 is shown with an elastically responsive unibody shear member 100 disposed therein. The valve 400 may be used in a variety of challenging applications such as within the high pressure or temperature environment of a well 480 (see FIG. 4). Similarly, ports 120, 127, 129 which are regulated by the valve 400 may be of dramatically different fluid pressures. By way of example, in one embodiment, a port 120 through a first housing 160 may accommodate a fluid pressure of several thousand PSI. However, other ports 127, 129 through a second housing 140 may be of negligible pressure.

The valve 400 is constructed in light of the potential dramatic pressure differentials, the downhole environment, and other possible challenges. For example, rather than reliance upon elastomeric seals to govern the fluid flow through the ports 120, 127, 129, the shear member 100 and housings 140, 160 may be formed of high quality stainless steel or other high hardness, suitably robust metals. Thus, as the member 100 is shifted up or down within a carrier 110 of the shear space 175 and adjacent the housings 140, 160, the ends of the member 100 may durably withstand physical interfacing with the housings 140, 160 (see FIGS. 3A & 3B).

Further, consider the noted exemplary circumstance where one port 120 is of comparatively high pressure as compared to others 127, 129. In the embodiment of FIG. 1, this high pressure port 120 is in communication with a channel 125 through the shear member 100. The position of this channel 125 leaves it closed off by the second housing 140. However, as described below, the channel 125 and shear member 100 may move up and down so as to expose a fluid line of communication between the high pressure port 120 and one of the others 127, 129. As such, a sudden influx of pressure may rush through this newly opened pathway. Nevertheless, the use of metal to metal interfacing between the member 100 and housing sidewalls 180, 185 allows the valve 400 to perform without concern over loss of an elastomeric seal to the sudden influx of pressure.

Perhaps most notably though, the shear member 100 includes an energizing region 101 that is tailored in such a manner as to allow the member 100 to be of unibody construction. That is, for effective function, each end 150, 155 of the member 100 is to interface a respectively adjacent sidewall 180, 185 as the carrier 110 is moved up or down. Thus, a biasingly energizing component, the energizing region 101, is incorporated into the shear member 100. However, as indicated, this is done in a manner that avoids the use of a discrete separately disposed feature. Rather, the member 100 and region 101 are of the same uniform construction.

Figure 4:
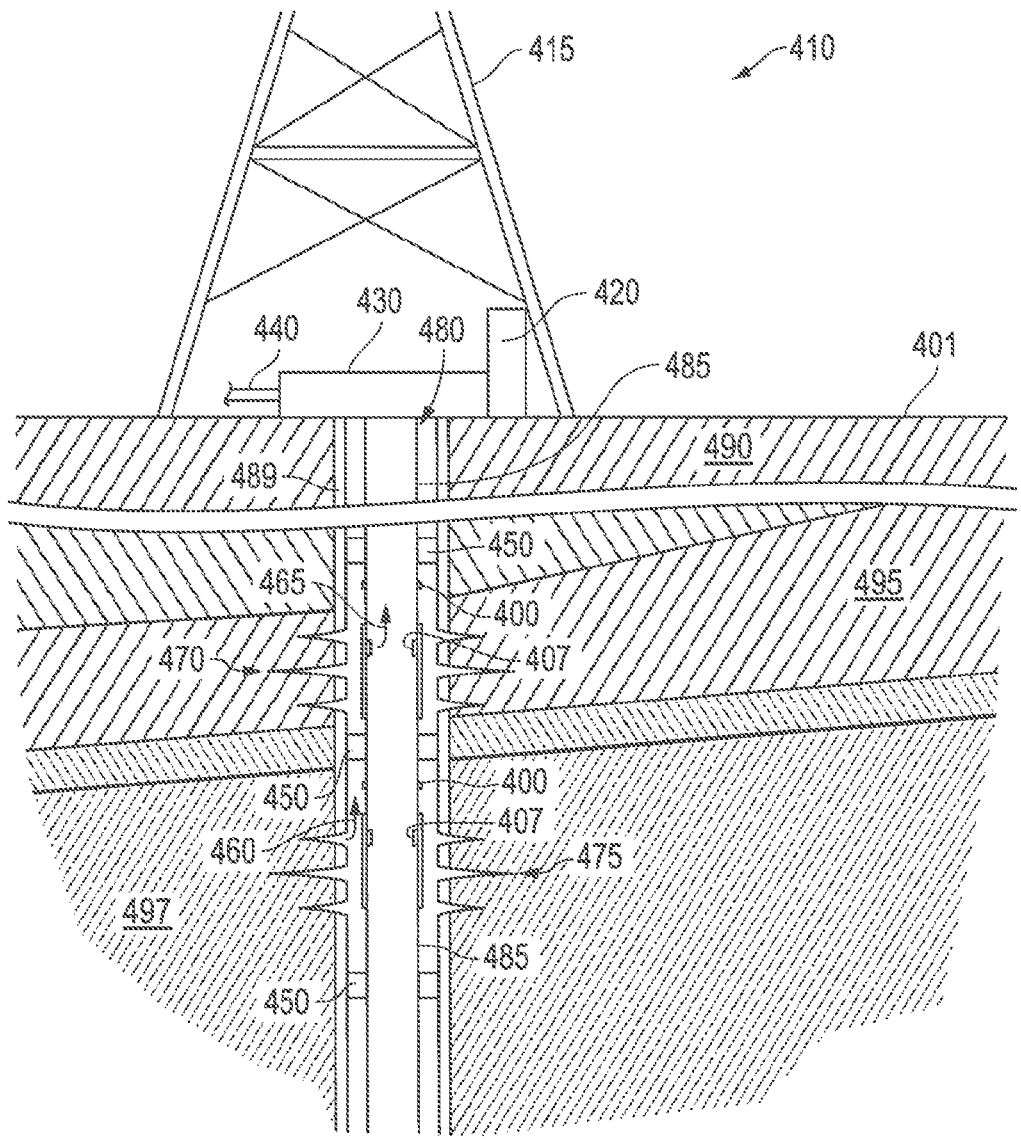
FIG. 4 is an overview of an oilfield accommodating a multi-zone well utilizing embodiments of the shear valve of FIG. 1 therein to govern production.

Maintaining a uniform construction, from end 150 to end 155, including the energizing region 101 between, allows the shear member 100 to be of effective and functional precise tolerances. For example, the valve 400 may be of notably very small dimensions for use in environments as depicted in FIG. 4. More specifically, the shear member 100 may be of cylindrical form, likely less than about half an inch in diameter. Notice the small cylindrical body of the member 100 sealably retained by rings 115 within the carrier 110. Nevertheless, in spite of the small overall size, the unibody construction means that the likelihood of mismatched dimensions or tolerances between independently constructed member components may be effectively removed. Instead, as detailed further below, an elastically responsive unibody shear member 100 is provided.

Figure 2:
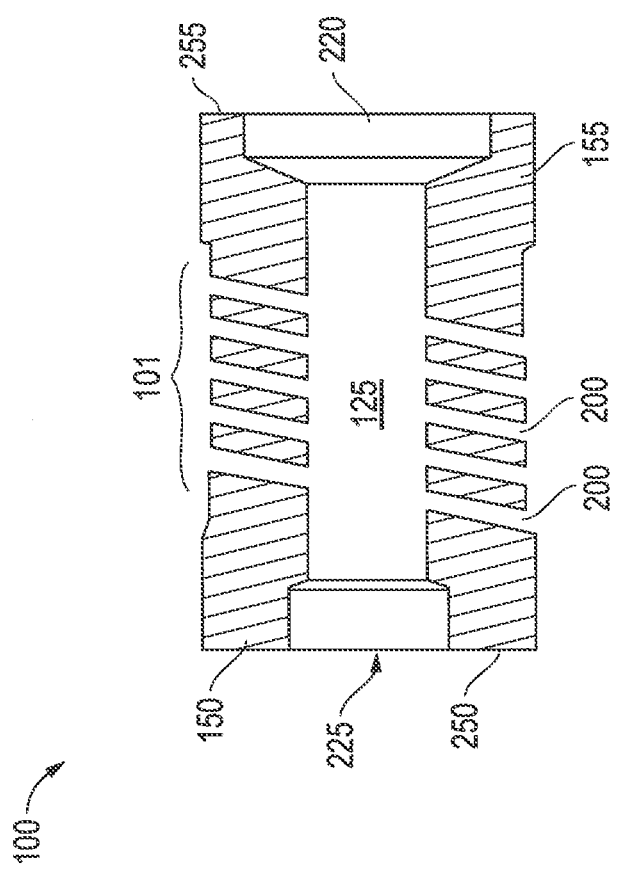
FIG. 2 is an enlarged side view of the elastically responsive unibody shear member of FIG. 1.

Referring now to FIG. 2, an enlarged side view of the elastically responsive unibody shear member 100 of FIG. 1 is shown. In this view, it can be seen that the energizing region 101 of the member 100 is of coil form. However, in other embodiments, different vertical in-cut configurations of the region 101 may be utilized. So long as the metal shear member 100 is provided with a comparatively weakened or elastically responsive biasing-type of character, the energizing region 101 is effective relative the ends 150, 155. More specifically, each end 150, 155 includes a face 250, 255 for directly interfacing the adjacent housing 140, 160 as described above with respect to FIG. 1. Thus, the energizing member 100 provides adequate energizing force for maintaining stability of the noted interfacing.

Continuing with reference to FIG. 2, the energizing region 101 is of a coiled variety as noted above. Thus, the shear member 100 appears to have vertically oriented in-cuts 200 into the body thereof, slanted in the direction of the coil winding of the region 101. Indeed, the region 101 takes on the nature of a coil spring. However, unlike a separately provided spring, the energizing region 101 uniformly merges into the metal ends 150, 155 of the member 100. As such, dead ends of the coil or region 101 are not to be found. That is, as opposed to useless dead ends of a spring and added tolerance build up, the region 101 transitions into the functional metal ends 150, 155 of the unibody shear member 100. Once more, as noted above, this is achieved in a manner that avoids the use of separately disposed components of the member 100. Therefore, machining tolerance issues that may be more of a challenge for matching miniaturized geometries of separate components may be avoided.

The shear member 100 may be uniformly constructed of a single metal-based material. However, surfaces may also be coated with a protective layer selected based on the types of environments in which the valve 400 is to be utilized (e.g. see FIG. 4). For example, in one embodiment the shear member 100 may be coated with a hard facing material such as tungsten carbide. Regardless, due to the metal-base of the member 100 it avoids issues with potential swelling or degradation to the levels that would likely persist with conventional elastomers.

Figure 3A:
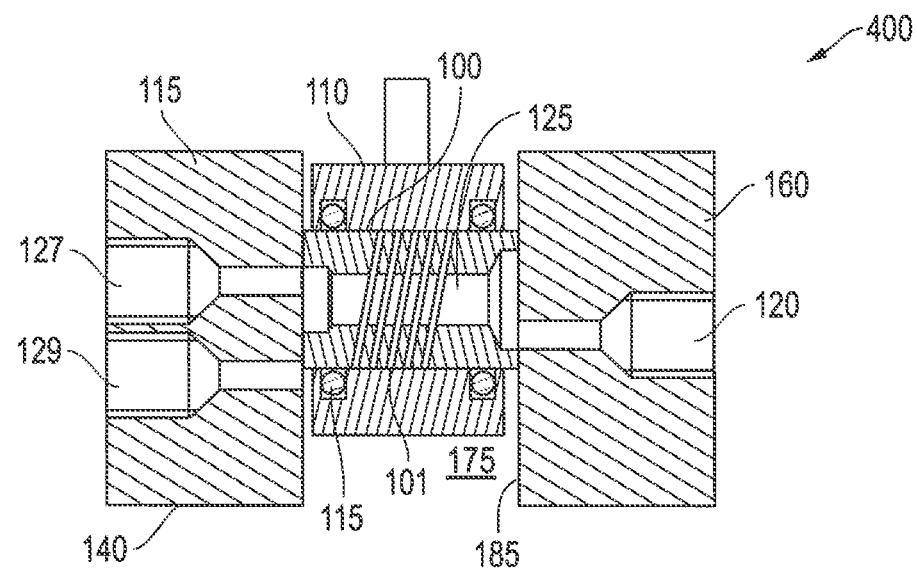
FIG. 3A is a side view of the shear valve of FIG. 1 in a first position to allow a given fluid communication type through the unibody shear member of FIG. 2.
Figure 3B:
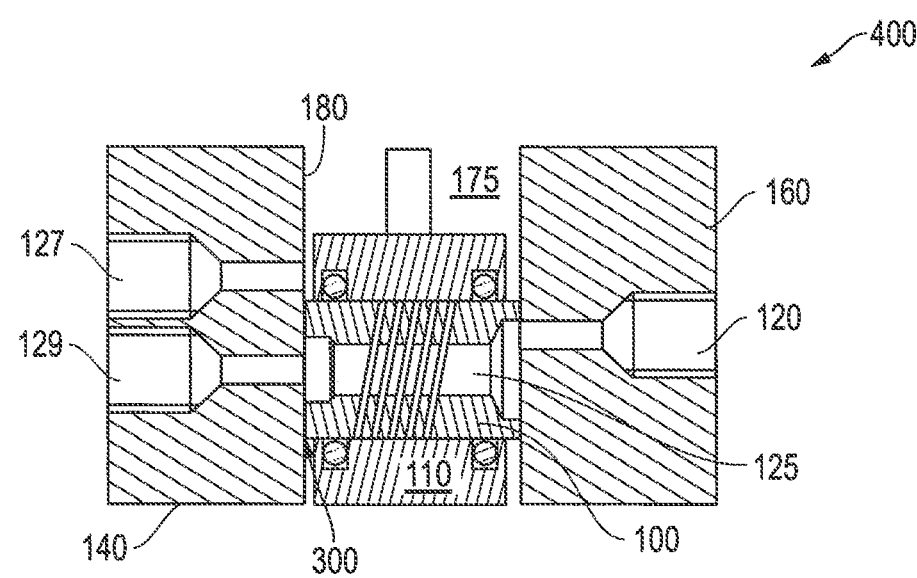
FIG. 3B is a side view of the shear valve of FIG. 1 in a second position to allow another fluid communication type through the unibody shear member of FIG. 2.

Referring now to FIGS. 3A and 3B, side views of the shear valve 400 are shown as the unibody shear member 100 is moved to govern different fluid lines of communication from one housing 160 to another 140. More specifically, FIG. 3A depicts the unibody shear member 100 in fluid communication with a first port 120 at a first housing 160 and a second port 127 at a second housing 140. However, FIG. 3B depicts the unibody shear member 100 repositioned to another location that maintains communication with the first port 120 while switching communication from the second port 127 to a third 129.

Continuing with added reference to FIG. 2, the switch in communication between ports 127 and 129 is achieved through the use of different sized funnel guides 220, 225 at the ends of the channel 125. Namely, the first funnel guide 220 is large enough to maintain communication with the first port 120 in spite of the shift in location of the shear member 100. However, the second funnel guide 225 is sized to provide more discrete communication with only one of two adjacent ports 127, 129 of the second housing 140 at a time (or even none as depicted in FIG. 1).

As the carrier 110 is moved to shift positions of the unibody shear member 100 within the shear space 175 as described above, an interfacing 300 between the member 100 and sidewalls 180, 185 is sealably maintained. As described hereinabove, the stability of this moving and sealable interfacing 300 is enhanced by the uniquely tailored energizing region 101 of the shear member 100. More specifically, the region 101 provides an elastically responsive character to the member 100 while allowing it to advantageously retain unibody construction as detailed hereinabove. In addition to the advantages described above, the uniformity may also allow for enhanced tailoring of the preciseness of the member's fit within the carrier 110. Thus, a degree of added stability and reliability may also be achieved.

Referring now to FIG. 4, with added reference to FIGS. 1-3A and 3B, an overview of an oilfield 401 is shown that is reflective of an environment which may beneficially employ an embodiment of a shear valve 400 as detailed hereinabove. More specifically, the oilfield 401 accommodates a multi-zone well 480 with a shear valve 400 having an elastically responsive unibody shear member 100 incorporated therein. Thus, the shear valve 400 is well suited to operate effectively in the potentially high pressure and high temperature environment of a well 480. Once more, due to shear member 100 avoidance of thin wire spring-related multi-components and/or elastomeric construction, the valve 400 may operate effectively for an extended period. For example, the valve 400 may reliably operate as a pilot or governing valve to open and close flow control valves 407 of production tubing 485 hardware. Indeed, production flow 460, 465 into production tubing 485 for a period exceeding about 5 years in this manner. In one embodiment, the valve 400 may effectively operate for a period exceeding about 20 years.

Continuing with reference to FIG. 4, the valve 400 is incorporated into separate locations of the noted production tubing 485. That is to say, there are multiple valves 400 which are utilized to independently govern flow 460, 465 into the production tubing 485 at different locations via flow control valves 407. This is due to the fact that the well 480 traverses a variety of formation layers 490, 495, 497 with different production regions 470, 475 adjacent perforated casing 489 which defines the well 480. Thus, the well 480 may be zonally isolated by packers 450 such that the flow 460, 465 from the separate regions 470, 475 is separately regulated. For example, over the course of the life of the well 480, one region 475 may begin to produce water 460. Thus, the corresponding valve 400 may be closed to prevent the uptake of such fluid into the production tubing 485. At the same time however, hydrocarbon production 465 may continue from the other region 470. In this case, the corresponding valve 400 may be left open, allowing production through the tubing 485.

In the embodiment shown, control over the opening and closing of the valves 400 may be directed from surface equipment 410 at the oilfield 401. More specifically, a control unit 420 is shown adjacent the well head 430 so as to ultimately control the mix of production that eventually makes it to the production line 440. Of course, a rig 415 and other surface equipment 410 may be provided to support a variety of different interventional applications over the life of the well 480. In conjunction with such applications, an operator may continue to open and close the valves 400 as needed. Indeed, the operator is left with an increased amount of flexibility given that production may be open and closed, zone by zone, depending on changing well conditions, potential interventions or for any number of other reasons over the substantial life of the well 480.

While valves 400 are described in some embodiments as being deployed for flow control in a multi-zone well, in other embodiments valves 400 may be deployed in other hydraulic downhole tools for different completion or intervention operations. For instance, valves 400 may be included in, or work in conjunction with, formation isolation valves, hydraulically set packers, safety valves, piloted chemical injection systems, or other hydraulically assisted intervention tools.

Figure 5A:
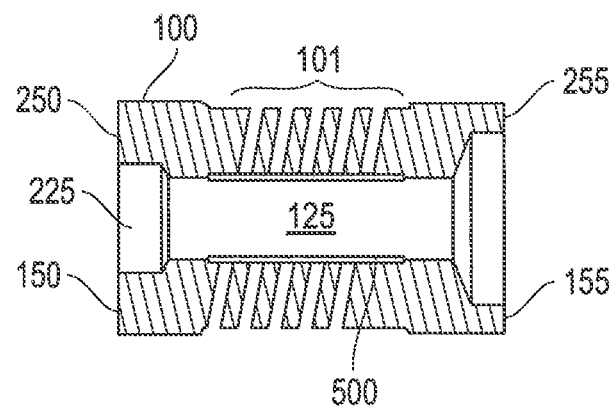
FIG. 5A is an enlarged side view of an alternate embodiment of elastically responsive unibody shear member.
Figure 5B:
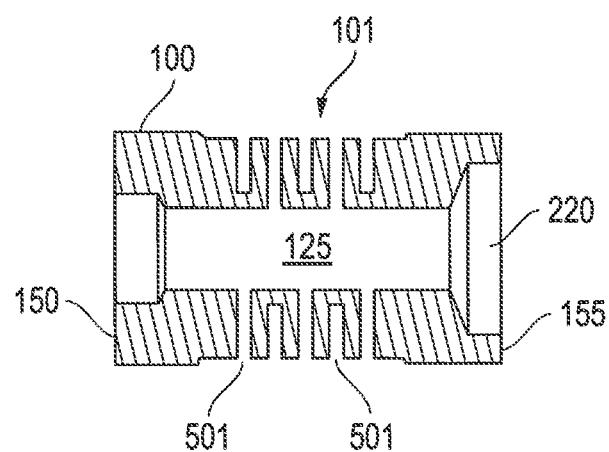
FIG. 5B is an enlarged side view of another alternate embodiment of elastically responsive unibody shear member.

Referring now to FIGS. 5A and 5B, enlarged side views of alternate embodiments of an elastically responsive unibody shear member 100 are shown. More specifically, in the embodiment of FIG. 5A, a shear member 100 is depicted which utilizes an internal protective sleeve insert 500 whereas the embodiment of FIG. 5B depicts a shear member 100 that includes an energizing region 101 of a non-helical variety.

With specific reference to FIG. 5A, the noted protective insert 500 may be added to the underside of the energizing region 101, defining the channel 125 thereat. Thus, a protective measure may be provided in light of the types of fluids and debris which are likely to traverse the channel 125 during operation. However, unlike the faces 250, 255 and ends 150, 155 of the shear member 100, this insert 500 may not play a significant structural role in the interfacing of the housings 140, 160 (see FIGS. 1 and 2). Thus, the material choices for the insert 500 may be more varied. For example, an erosion resistant material or coated sleeve may be utilized for the insert 500 without undue concern over interfacing performance.

Referring specifically to FIG. 5B an enlarged side view of another alternate embodiment of the elastically responsive unibody shear member 100 is shown. As indicated, in this embodiment, the energizing region 101 is non-helical. That is, as opposed to a more typical spring-like configuration, radial in-cuts 501 are made into the member 100 such that they are axially offset from one to the next. Thus, a structural discontinuation would be provided along any given axial line from one end 150 to another 155. Yet, similar to a coil or helical arrangement, the energizing region 101 would remain expansive, compressible and structurally intact. Further, along these lines, bellows, corrugated, accordion-like arrangements and others may be utilized as an effective energizing region 101 for a unibody shear member 100.

Figure 6:
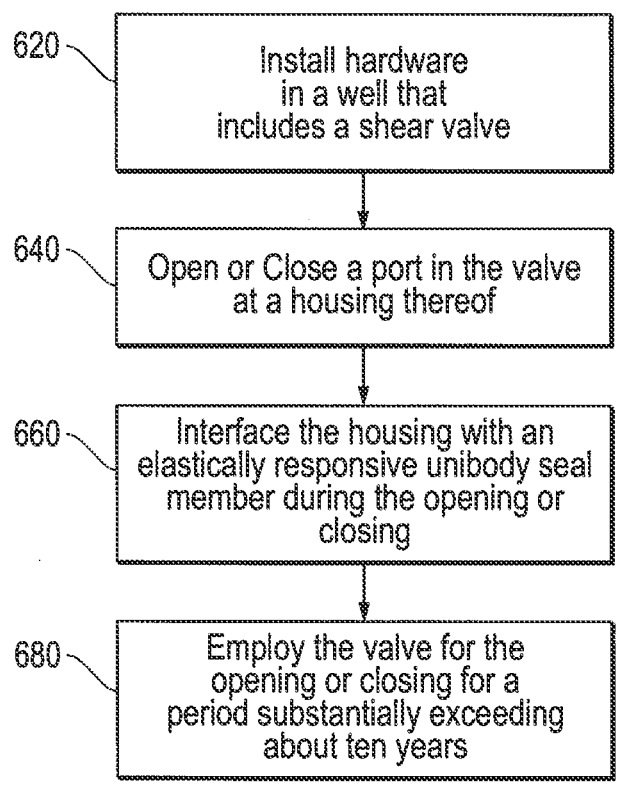
FIG. 6 is a flow-chart summarizing an embodiment of utilizing a shear valve with elastically responsive unibody shear member in an oilfield environment.

Referring now to FIG. 6, a flow-chart summarizing an embodiment of utilizing a shear valve is depicted. More specifically, the valve includes an elastically responsive unibody shear member and is installed in an oilfield environment as indicated at 620. The valve may be utilized to open or close any number of ports as noted at 640. Once more, as detailed hereinabove, this may lead to the sudden influx or exposure of the valve to a high pressure differential given the nature of the downhole environment.

In spite of the potential for sudden exposure to such extreme pressures, the valve operates with an internal elastically responsive unibody seal member as indicated at 660. That is, the interfacing that is provided by the member as access to a port is switched on, off or otherwise actuated, is achieved without the need of a multi-component energizing member assembly. Rather a single unibody member as detailed hereinabove may suffice. As a result, the valve may be employed for opening and closing ports for the substantial duration of the life of the well (e.g. in excess of about five years as indicated at 680).

Embodiments described hereinabove include shear valves that are suitable for use in downhole, high pressure environments without need for reliance on short-lived elastomeric energizers. Once more, the shear valve need not rely on micro-machined thin wire springs wedged between separate blocks of metal. Thus, issues associated with imprecise tolerances between different parts may be largely avoided. Further, an even longer lasting shear valve may result.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, embodiments herein depict a two-position valve. However, fewer or more ports may be regulated by such a shear valve employing a unibody shear member as detailed herein.

Once more, the shear member itself may utilize dimensional features aside from those of an energizing variety. For example, the center of the member may be of a narrower outer diameter as compared to the ends as an aid to installation (e.g. to avoid cutting of adjacent O-rings). In yet another example, a separate component may be disposed or incorporated with the shear member such as a cooperating metal ring seal insert for also interfacing an adjacent housing. Nevertheless, the member itself may also continue to interface the housing at a face thereof, thus retaining its unibody functional character. Regardless, the foregoing description should not be read as pertaining only to the precise structures described and shown in the accompanying drawings, but rather should be read as consistent with and as support for the following claims, which are to have their fullest and fairest scope.

We claim:

1. A shear valve assembly comprising:
    a first housing accommodating a first fluid port;
    a second housing accommodating a second fluid port; and
    an elastically responsive unibody shear member disposed in a shear space between said housings, said member to directly interface each of said housings and govern fluid flow relative said ports.

2. The assembly of claim 1 further comprising a carrier accommodating said unibody shear member within the shear space, said carrier for moving said member from a first position to a second position within the space.

3. The assembly of claim 2 wherein said unibody shear member includes a channel therethrough for fluidly coupling to no more than one of the ports when in the first position.

4. The assembly of claim 2 wherein said unibody shear member includes a channel therethrough for fluidly coupling the ports to one another when in the second position.

5. The assembly of claim 1 wherein a pressure differential greater than about 5,000 PSI is present as between the ports.

6. The assembly of claim 1 said unibody shear member and said housings are of metal-based construction.

7. A unibody shear member for governing fluid flow through a shear valve, the shear member including a protective outer layer coating and further comprising:
    a first end for interfacing a first housing of the valve, the first housing accommodating a first fluid port;
    a second end for interfacing a second housing of the valve, the second housing accommodating a second fluid port; and
    an elastically responsive energizing region between said ends for biasing thereof relative the housings during the governing of the fluid flow.

8. The unibody shear member of claim 7 wherein said elastically responsive energizing region is of a configuration selected from a group consisting of a helical configuration, an offset radial in-cut configuration, a bellows configuration and a corrugated configuration.

9. The unibody shear member of claim 7 wherein said elastically responsive energizing region includes a channel therethrough for selective fluid communication with the ports during the governing of the fluid flow.

10. The unibody shear member of claim 9 wherein said elastically responsive energizing region includes a protective sleeve at an underside thereof defining the channel.

11. The unibody shear member of claim 10 wherein the protective sleeve is of tungsten carbide.

12. The unibody shear member of claim 7 wherein a shear space is located between the housings of the valve for accommodating a carrier thereat, the shear member of cylindrical form for accommodation by the carrier.

13. The unibody shear member of claim 12 wherein the shear member is less than about one half of an inch in outer diameter.

14. The unibody shear member of claim 7 wherein the coating is of tungsten carbide.

15. A method of governing fluid flow through a shear valve comprising:
    installing hardware in a well that includes the shear valve having adjacent housings, each with at least one port therethrough; and
    actuating the valve through an elastically responsive unibody seal member thereof, the valve directly interfacing each of the housings during the actuating for the governing of the fluid flow.

16. The method of claim 15 wherein said actuating effectively takes place about five years after said installing.

17. The method of claim 15 wherein said actuating comprises adjusting a position of the unibody seal member within a shear space of the valve to govern fluid flow through ports of adjacent housings defining the space.

18. The method of claim 15 wherein the shear valve is a first shear valve, the hardware including a second shear valve.

19. The method of claim 18 further comprising independently actuating the first shear valve and the second shear valve relative one another during operations in the well.

* * * * *